April 27, 1954
W. B. PRIDY
2,676,715
SELF-LOADING TRUCK FOR HEAVY PIPE
Filed April 16, 1952
4 Sheets-Sheet 1
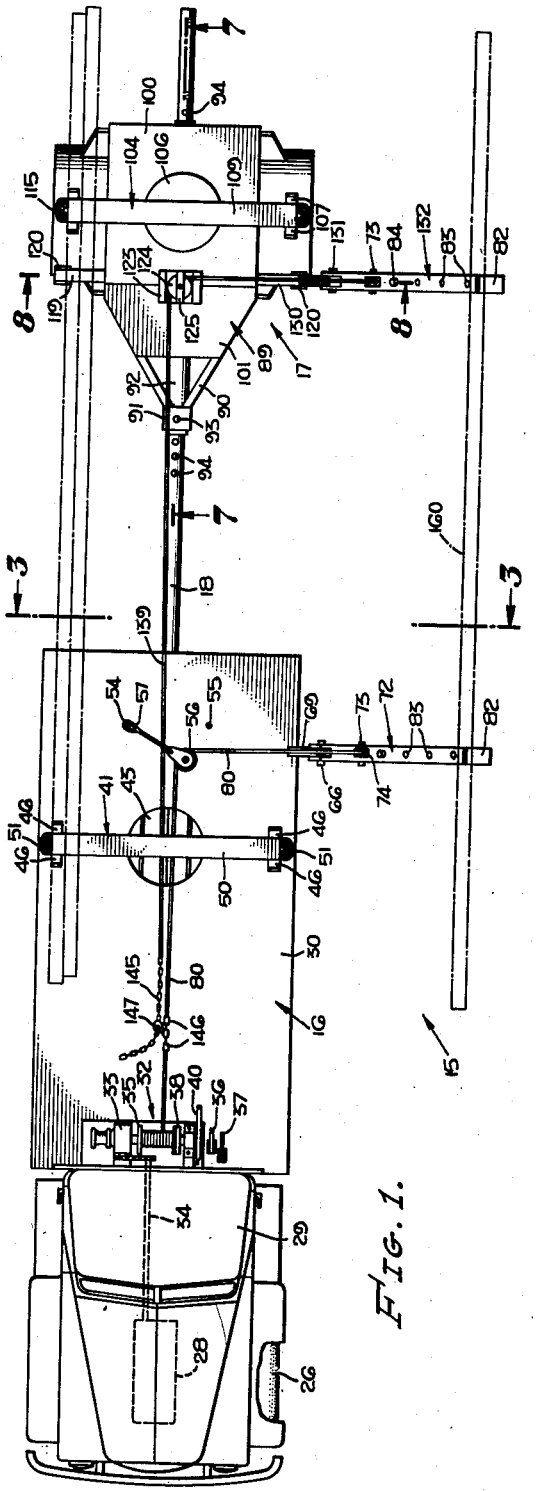
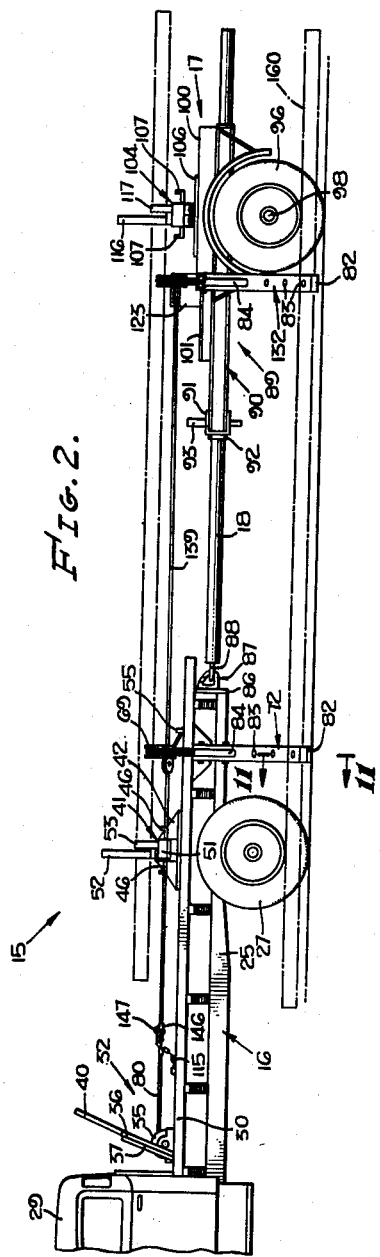
WHETSTINE B. PRIDY,
INVENTOR.
BY 
ATTORNEY.

April 27, 1954 W. B. PRIDY 2,676,715
SELF-LOADING TRUCK FOR HEAVY PIPE
Filed April 16, 1952 4 Sheets-Sheet 2
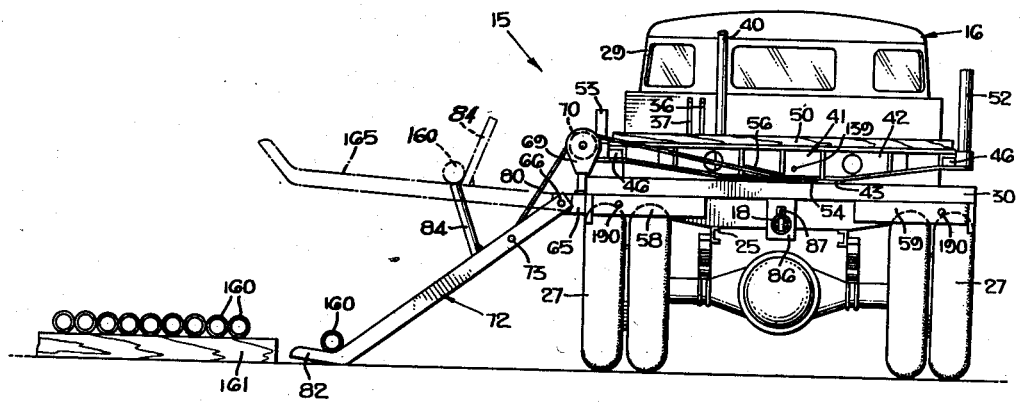
FIG. 3.
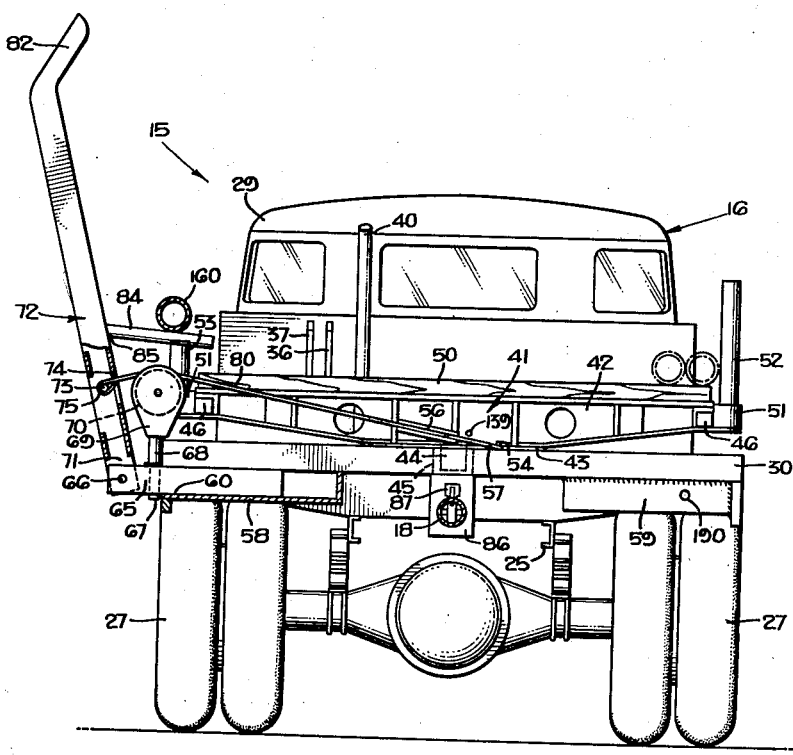
FIG. 4.
WHETSTINE B. PRIDY,
INVENTOR.
BY 
ATTORNEY.

April 27, 1954  W. B. PRIDY  2,676,715
SELF-LOADING TRUCK FOR HEAVY PIPE
Filed April 16, 1952  4 Sheets-Sheet 3

WHETSTINE B. PRIDY,
INVENTOR.

BY

ATTORNEY.

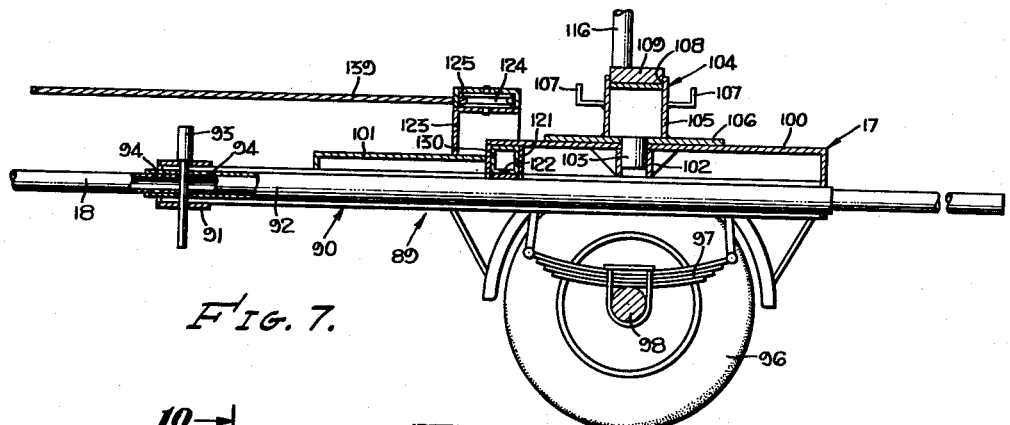
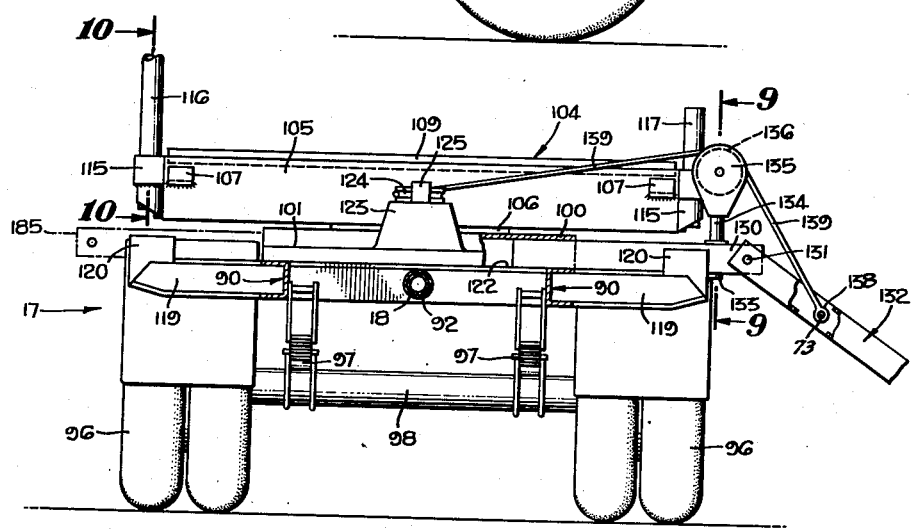
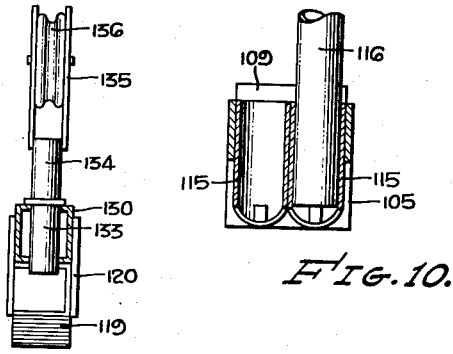
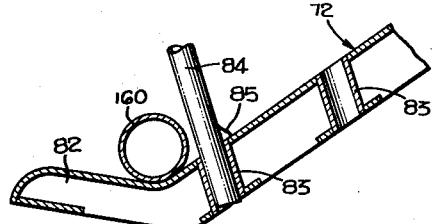

Patented Apr. 27, 1954

2,676,715

UNITED STATES PATENT OFFICE 2,676,715

SELF-LOADING TRUCK FOR HEAVY PIPE

Whetstine B. Pridy, Long Beach, Calif.

Application April 16, 1952, Serial No. 282,613

7 Claims. (Cl. 214—77)

This invention relates to pipe handling equipment and is particularly useful in picking up and transporting loads of heavy pipe lengths such as are used in oil production operations.

The invention is adapted to be used in connection with any equipment employed for transporting loads of heavy pipe lengths. Such equipment includes the following types: a power driven truck having a relatively long bed; a truck and trailer in which there is a relatively long trailer for carrying the pipe; a truck and trailer in which there is a pipe rest on the truck and a pipe rest on the trailer and in which the pipe is supported on both of said pipe rests; and the ordinary railway flat car which is also extensively used for transporting such pipe lengths.

It is an object of the present invention to provide, in association with a means of transporting loads of heavy pipe lengths, a simple and inexpensive mechanism for loading such pipe lengths onto said transport means.

It is a further object of the invention to provide such a mechanism which is relatively simple, of light weight, and is adapted to be assembled on the transport means, disassembled therefrom, and operated with a minimum of labor.

A further object of the invention is to provide such a mechanism for loading heavy pipe lengths onto a transport means therefor which may be optionally assembled on the transport means to load pipe lengths thereon from the left side or the right side thereof.

Yet another object of the invention is to provide a truck and trailer in which one end of a load of pipe rests on the truck and the other end of said load rests on the trailer, with a pipe loading mechanism as aforesaid mounted partly on said truck and partly on said trailer.

It is a further object of the invention to provide such a truck and trailer equipped with said pipe loading mechanism in which the portions of said mechanism on said trailer and said truck are coordinately actuable from said truck.

A still further object of the invention is the provision of such a truck and trailer and loading mechanism in which the spacing of said trailer from said truck is adjustable and in which the operation of the portions of said mechanism on said truck and trailer are operable in correct coordination from said truck, said changes in the spaced relation between said truck and said trailer notwithstanding.

The manner of accomplishing the foregoing objects as well as further objects and advantages will be made manifest in the following description taken in connection with the accompanying drawings in which Fig. 1 is a plan view of a preferred embodiment of the invention with a truck and trailer showing the same in readiness for starting a pipe loading operation, the position of two pipes, as when these have been delivered onto the truck and trailer, and the position of another pipe resting on the apparatus and about to be delivered onto the truck and trailer, being shown in broken lines.

Fig. 2 is a side elevational view of Fig. 1.

Fig. 3 is an enlarged cross sectional view taken on the line 3—3 of Fig. 1 showing the pipe loader of the invention in readiness to start a loading operation, a loading arm being shown in full lines in its lowermost position and in broken lines partly elevated to the point where the pipe shown thereon is caused to roll inwardly against a secondary arm.

Fig. 4 is a view similar to Fig. 3 and still further enlarged, this view showing said pipe loading arm swung to a higher position in which said secondary arm is inclined inwardly causing the pipe to roll from said secondary arm onto the pipe rests provided on said truck and trailer.

Fig. 7 is an enlarged vertical sectional view taken on the line 7—7 of Fig. 1 showing the detailed construction of the trailer of the invention.

Fig. 8 is an enlarged fragmentary cross sectional view taken on the line 8—8 of Fig. 1 and looking rearwardly at the trailer of the invention, this view illustrating the structure of mountings for the loading mechanism and the means for incorporating it with said trailer.

Fig. 9 is an enlarged vertical sectional view taken on the line 9—9 of Fig. 8 and illustrates one of the sheave mounts.

Fig. 10 is an enlarged detail vertical sectional view taken on the line 10—10 of Fig. 8 and illustrates the construction of stanchion sockets provided on the pipe rests of the truck and trailer of the invention.

Fig. 11 is a diagrammatic detail view taken on the line 11—11 of Fig. 2 and illustrating the structure of an end portion of one of the pipe loading arms of the invention and the manner of mounting said secondary arms on said loader arms.

Figure 5:
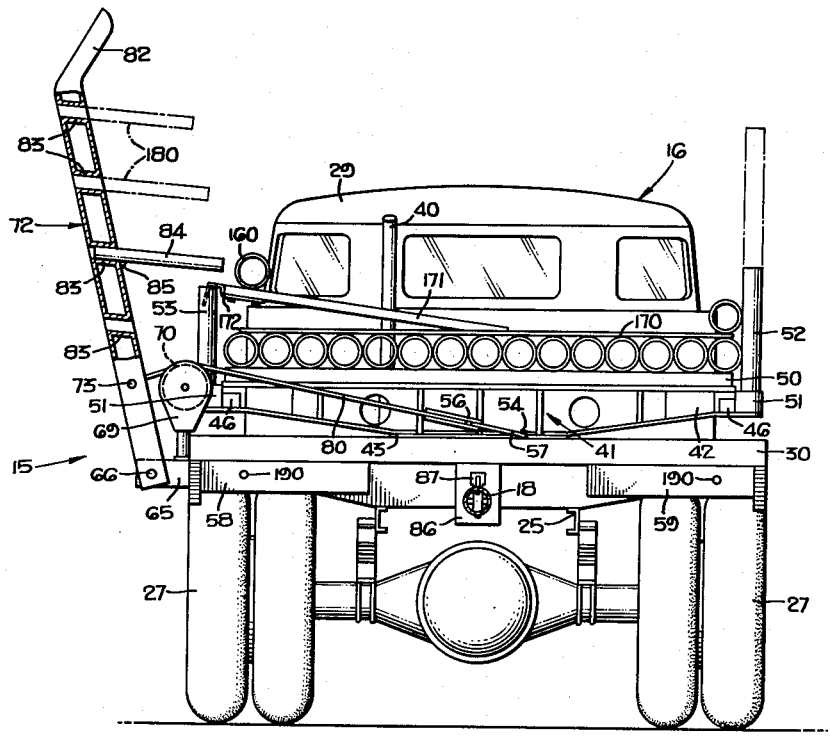
Fig. 5 is a view similar to Fig. 4 and illustrates the delivery of a pipe onto said truck and trailer at a higher level than that at which pipe is shown as being delivered in Fig. 4 so as to form a second tier of pipe in loading said truck and trailer.

Referring specifically to the drawings, the invention is therein disclosed as embodied in a pipe transport 15 which includes a motor driven truck 16 and a two-wheel "dolly" type trailer 17 which is hitched to the rear end of the truck 16 by a tongue 18.

The truck 16 may be of any standard design having a chassis 25 with dirigible wheels 26 at its front end and drive wheels 27 toward its rear end. Mounted on the chassis 25 is a motor 28, a driver's cab 29 and a flat cargo bed 30. Mounted on the bed 30 just behind the cab 29 is a cable winch 32 having a transmission 33 which is connected by a power take-off 34 to the motor 28 in order to transmit power from said motor to a cable drum 35 of said winch. The transmission 33 is controlled by clutch and gear shift levers 36 and 37. The drum 35 has a brake 38 which is controlled by a lever 40.

Pivotally mounted on the bed 30 on a vertical axis intercepting the longitudinal axis of the truck 16 is a pipe rest 41 including a fabricated steel base 42 having a bearing disk 43 and a central pivot pin 44 which fits into a suitable vertical bearing 45 provided therefor on the bed 30 (Fig. 4). Formed on the base 42 to extend forwardly and rearwardly therefrom near its opposite ends are unloading ramp supporting brackets 46. Fixed on the upper face of the base 42 is a timber pipe-supporting cushion 50. Formed on each of the opposite ends of the base 42 is a pair of stanchion sockets 51 for holding tubular stanchions 52 and 53.

Pins 54 and 55 are mounted in the bed 30 between the pipe rest 41 and the rear end of the bed (Fig. 1), these pins being provided as anchors for a sheave 56, an eye 57 of which is adapted to be looped over either of said pins. Secured to the bottom of the bed 30 as by welding are horizontal channels 58 and 59 which are preferably square in cross section, these channels forming pockets 60 which are closed at their inner ends, open outwardly and lie in the same transverse vertical plane.

Slidably insertable into either of the pockets 60 is a hollow mounting bar 65 with a square cross section to nonrotatably fit either of the pockets 60, said bar being coextensive in length with each of said pockets.

The outer end of bar 65 is horizontally apertured to receive a pivot pin 66 and vertically apertured a short distance inwardly therefrom to receive a pin 67 provided on the lower end of the shank 68 of a sheave mount 69 within which a sheave 70 is rotatably mounted. The shank 68 engages the bed 30 and thus limits inward movement of the bar 65 into the pocket 60 in which it is inserted. The pin 66 serves to pivotally connect the outer end of bar 65 and a bifurcated inner end 71 of a pipe loading arm 72 which is preferably of a square tubular construction. This arm is provided with a pin 73 and an upper opening 74, pin 73 penetrating a loop 75 provided at the end of a cable 80 which extends from the pin 73 through the opening 74, over the sheave 70, around the sheave 56 and thence forwardly to the winch 32 where it is secured to and wound around drum 35 thereof.

The pipe loading arm 72 has a foot 82 on the outer end thereof which is formed to incline upwardly therefrom when the pipe loading arm 72 is extended downwardly into contact with the ground as shown in Fig. 3. Formed in the pipe loading arm 72 at spaced intervals therealong is a series of tubular sockets 83, any one of which is adapted to receive a small tubular secondary arm 84 having a lug 85 thereon which limits the distance arm 84 may be inserted into one of the sockets 83. The sockets 83 are uniformly inclined relative to the loading arm 72 substantially as shown in Figs. 3, 4 and 5.

Figure 6:
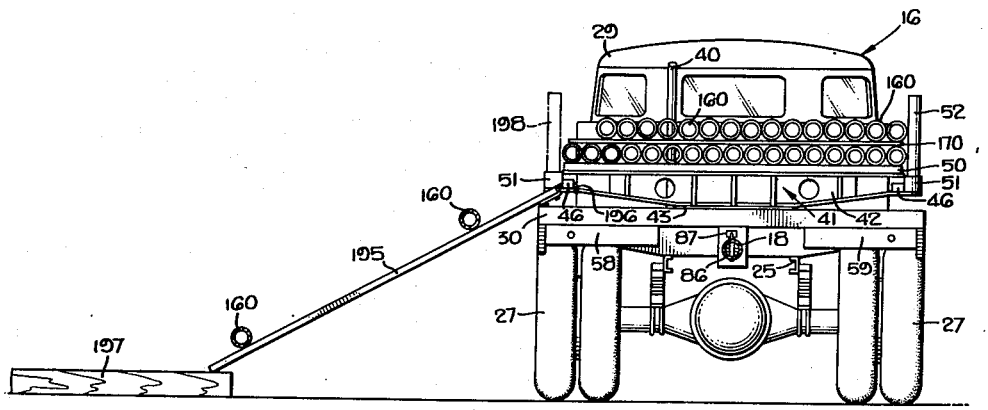
Fig. 6 is a view similar to Fig. 3, with the truck shown as loaded with two tiers of pipe, and with the loader of the invention disassembled from the truck body, and showing ramps for use in unloading the pipe by rolling the same downwardly on said ramps onto ground timbers positioned to receive the same.

A plurality of stanchions 52 and 53 of various heights are provided as indicated in Figs. 4, 5 and 6 for purposes which will be made clear hereinafter.

Secured to the bed 30 near the rear end thereof and extending downwardly therefrom is a plate 86 carrying a self-latching hook 87 on which an eye 88 provided on the forward end of tongue 18 is hooked (Fig. 2). This tongue is preferably of cylindrical tubular construction and is adjustable relative to the trailer 17 in a manner which will be pointed out hereinafter so as to vary the distance at which said trailer follows the truck 16.

Referring now to Figs. 7 and 8, the trailer 17 has a chassis 89 including a channel iron frame 90 which converges forwardly (Fig. 1) to terminate in a box 91. Rigidly united with the frame 90 so as to lie on the longitudinal axis of the trailer 17, and extending forwardly through the box 91 and welded to said box, is a tongue receiving tube 92. The tongue 18 is slidably received within the tube 92 and is adjustably positioned lengthwise in said tube by a pin 93 which is adapted to be inserted vertically through aligned holes in the box 91 and tube 92 (Fig. 7) and through any selected pair of a longitudinally spaced series of pairs of vertically aligned holes 94 provided in the tongue 18.

The frame 90 is supported on rubber tired wheels 96 through springs 97 and an axle 98 on which said wheels are mounted. Supported on the frame 90 and fixed thereto as by welding are a sheet metal deck 100 and a sub-deck 101. Provided in the deck 100 is a vertical bearing 102 which is adapted to rotatably receive a pin 103 of a pipe rest 104 which is supported on deck 100. This pipe rest is fabricated from structural steel and includes a base structure 105 on which a bearing disk 106 is provided which is concentric with the pin 103, bears against the deck 100 and supports the pipe rest 104. Welded to opposite end portions of the base 105 and extending forwardly and rearwardly therefrom are unloading ramp supporting brackets 107.

The upper face of the base 105 provides a recess 108 in which a timber pipe-supporting cushion 109 is mounted. Secured to each of the opposite ends of the base 105 as by welding is a pair of stanchion sockets 115 for supporting stanchions 116 and 117 which are of the same diameter and are provided in various lengths as above noted for stanchions 52 and 53.

Formed on frame 90 to extend laterally therefrom in the same transverse plane are channel iron extensions 119 which have U-shaped guides 120 mounted on their outer ends extending upwardly therefrom, these guides being in horizontal transverse alignment with a guide box 121 formed just beneath the forward edge of the deck 100 to provide a guide pocket 122, square in cross section and extending from end to end thereof. Mounted partly on the deck 100 and partly on the sub-deck 101 is a sheave mount 123 carrying a sheave 124 which is rotatable thereon on a vertical axis. This sheave is held in place by a U-shaped bracket 125 which overlies the same and is welded to the mount 123 so that this bracket prevents a cable trained around sheave 124 from slipping off said sheave.

Slidable in the guides 120 and pocket 122 so as to be non-rotatable therein is a hollow loading arm mounting bar 130 which is preferably square in cross section and apertured horizontally at its outer end to receive a pin 131 which pivotally connects said bar with the bifurcated inner end of a loading arm 132 which is identical in construction with the loading arm 72 and the details of the structure of which will be referred to hereinafter by the same reference numerals used in the detailed description of loading arm 72.

The bar 130 is also apertured vertically to receive the pin 133 of the shank 134 of a sheave mount 135 in which a sheave 136 is pivotally mounted (Fig. 9). The downwardly extending end of pin 133 engages the outer face of the adjacent guide 120 so as to limit the inward sliding of the bar 130 into the pocket 122.

The pin 73 of the pipe loading arm 132 penetrates a loop 138 formed on the end of a cable 139 which passes upwardly over sheave 136 and around the sheave 124 and then forwardly (Fig. 1) to its forward end which terminates in a chain 145. Secured to the cable 80 are clamps 146 which mount a hook 147 on cable 80, and the chain 145 has one of its links caught in said hook so that when cable 80 is wound up by the winch 32, this will pull upon both cables 80 and 139.

Being identical in construction with arm 72, arm 132 also has an upwardly inclined end foot 82, and sockets 83, and a secondary arm 84 with a stop 85 for selective insertion in said sockets as clearly shown in Fig. 11.

*Operation*

The invention is shown in Figs. 1, 2 and 3 as set up in readiness for commencing a pipe loading cycle by the repetition of which a load of pipe may be raised from ground level and delivered onto the pipe rests 41 and 104 of the pipe transport 15. For purposes of illustration, the pipe to be thus loaded is shown as comprising a series of pipe lengths 160 which are stored on ground timbers 161, one of these pipe lengths being shown in this view as already having been rolled from said timbers onto the feet 82 of pipe loading arms 72 and 132.

Before loading the first tier or layer of pipe lengths 160 onto the pipe transport 15, the secondary arms 84 are inserted into the uppermost sockets 83 of the pipe loading arms 72—132 as shown in Figs. 1, 2 and 3. While the invention may be employed to load more than a single length of pipe in one operation cycle, it has been found preferable in handling fairly heavy lengths of pipe to load one length at a time. With a heavy pipe length 160 resting on the extremities of the loading arms 72—132 as shown in Fig. 3, the operator, standing on the bed 30 of the truck 16, manipulates the levers 36, 37 and 40, while the motor 28 is running, so as to cause the winch 32 to wind up on the cable 80 thus pulling on both the cable 80 and the cable 139 and swinging the arms 72—132 upwardly.

When these arms rise into the positions shown by broken lines 165 in Fig. 3, the operation of winch 32 is halted to hold arms 165 in these positions while the pipe length 160 rolls inwardly along the arms 72—132 until it comes to rest against the secondary pipe loading arms 84. As soon as this occurs the operation of the winch 32 is resumed until the pipe loading arms 72—132 have been swung upwardly to the full line position indicated in Fig. 4 in which the secondary loading arms 84 have rotated with the arms 72—132 into positions in which arms 84 are slightly inclined inwardly so that the pipe section 160, being loaded, rolls inwardly along the arms 84 and drops off the inner ends thereof onto the timber cushions 50—109 of the pipe rests 41—104.

After having been thus delivered onto the pipe rests 41—104 this pipe section 160 is rolled manually across these rests until it contacts the stanchions 52—116 provided at the far ends of said rests as shown in Figs. 4 and 8. At the beginning of the pipe loading operation, stanchions 52 and 116 may be selected and installed, which are of the full height necessary for these stanchions to retain in place, on pipe transport 15, the complete load which it is intended to deliver thereon during the entire pipe loading operation. Stanchions 53 and 117, on the other hand, are required to be of different heights during successive phases of a loading operation, the height with which these stanchions are shown in Figs. 4 and 8 being the requisite height for these at the beginning of the loading operation when delivering the first tier of pipe lengths onto the pipe transport 15.

As indicated in Fig. 4 each pipe length 160, as it rolls inwardly along secondary loading arms 84, passes directly over the upper ends of stanchions 53—117. It is thus evident that the latter stanchions need to be short enough in the loading of each tier of pipe onto the pipe transport to allow the pipe lengths thus to pass over said stanchions, yet the latter need to be long enough to retain on the rests 41—104 the tier of pipe being delivered thereto. After completing the loading of a given tier of pipe, the arms 84 are shifted to the next lower pair of sockets 83 provided in the pipe loading arms 72—132 and the stanchions 53—117 are replaced by corresponding stanchions of the next longer size (Fig. 5) which will serve to retain the second tier of pipe from rolling off the pipe rests on that side of the pipe transport 15, while at the same time being low enough to permit the pipe to be delivered over these stanchions in forming said second tier.

In the substitution of one stanchion for another, the stanchion to be replaced always occupies one of the sockets of one of the pairs of stanchion sockets 51—115, the other socket of that pair being unoccupied. The replacing stanchion is inserted in said empty socket so that both stanchions are in place in pipe restraining positions before the stanchion to be replaced is removed from its socket. The substitution is thus effected without relaxing the restraint, provided by stanchions on this side of the pipe transport 15, against the pipe load being prematurely discharged therefrom.

Each of the tiers of pipe in the load, above the lowermost tier in the load, is preferably separated from the tier immediately therebeneath by wooden batten strips 170 (Figs. 5 and 6) and the labor of rolling the pipe lengths to the back side of the pipe transport is decreased by the use of a pair of ramp boards 171 each of which has a metal hook 172 on one end thereof which is adapted to be hooked over the upper end of one of the stanchions 53—117 so that the ramp boards 171 will provide an inclined ramp along which pipe lengths 160 may be rolled as shown in Fig. 5. When the back half of the tier thus being formed has been completed, the boards 171 are removed and the balance of that tier is formed by merely rolling the pipe from the secondary arms 84 directly onto the wooden batten strips 170 and manually rolling the pipe lengths into snug relation with each other. When loading the pipe transport 15 with pipe of the diameter illustrated in Fig. 5, the secondary arms 84 may be employed in the full line positions in which they are shown in this view for loading both the second and third tiers of pipe onto the pipe transport. The stanchions 53—117, shown in this view, are replaced, however, by stanchions of the next longer size before delivering the third tier of pipe onto the pipe transport.

As clearly shown in Fig. 5 by broken lines 180, the secondary loading arms 84 are placed in sockets 83 still further from the rotating axis of the arms 72—132 in order to deliver the still higher tiers of pipe of the load being assembled on the pipe transport 15. These higher tiers are loaded substantially in the same manner as described for the loading of the lower two tiers, the stanchions 53—117 being, in each instance, replaced by stanchions of greater length in starting the loading of each successively higher tier.

Prior to beginning loading operations or following any individual pipe length loading cycle, the arms 72—132 may be retained in elevated position as shown in Fig. 4 by setting the brake 46 on the winch drum 35 and the pipe transport 15 driven from place to place, as for picking up the remainder of the pipe to be loaded thereon.

While the invention is illustrated as set up for loading pipe onto the pipe transport from the left side thereof, it is readily adapted to be modified with a relatively small amount of labor to load pipe onto the pipe transport from the right-hand side thereof. This modification requires relaxing the cables 80 and 139 at the winch, removing the mounting bar 65 from the pocket 60 of the left-hand channel member 58, inserting it in a similar manner in the pocket 60 of the right-hand channel 59, removing loop 57 from pin 54 and placing this over pin 55 (Fig. 1).

The mounting bar 130 is also removed from the left guide 120 and left end of the pocket 122 on the trailer 17 and inserted in the right-hand guide 120 and right-hand end of the pocket 122 as indicated by broken lines 185 (Fig. 8). The cable 139 is then inserted in the opposite direction around the sheave 124 so as to actuate the arm 132 on the right side of the trailer 17 and the slack may then be taken up on the cable 80 by the winch 32 whereupon the arms 72—132 are in readiness for a pipe loading operation from the right side of the pipe transport. When loading from the right side, the functions of the stanchions 52—116 on the one hand and stanchions 53—117 on the other hand, are just reversed from the functions above described respectively for these when loading pipe from the left. In other words, the stanchions 53—117 then constitute back stops for the load as it is being delivered onto the pipe transport while the stanchions 52—116 are as short as possible, consistent with retaining in place the tier of pipe lengths currently being loaded onto the pipe transport, and always low enough so that pipe lengths being loaded may pass over the upper ends of said stanchions.

When the invention has been operated as above described to deliver onto the pipe transport whatever load of pipe it is desired to carry thereon, it is customary, if this load is to be hauled a considerable distance, to disassemble the loading arms 72—132 by pulling the pins 66 and 131 and removing the pulley mounts 69—135 from the vertical apertures in the mounting bars 65—130 and store the elements thus disassembled, at some convenient place on the truck 16. The mounting bars 65—130 may be stored by shifting these inwardly into one of the pockets 60 and into pocket 122 respectively and retained therein by replacing the pins 66 and 131 in these bars so as to anchor the latter in said pockets to prevent their accidental discharge therefrom. To accomplish the retention of bar 65 in either of the pockets 60 in which it might be placed, aligned pairs of holes 190 are provided in the channels 58 and 59 and the pin 66 is extended through one of the pairs of holes 190 and through a suitable aperture in the bar 65 so as to lock the latter in the pocket 60 containing the same.

Upon arrival of the pipe transport 15 of this invention at its destination with a load of pipe, the following means is adapted to be utilized in unloading said pipe and delivering it to a timber rack on the ground level.

As shown in Fig. 6, this means includes a pair of ramp boards 195 which are substantially longer than the ramp boards 171 shown in Fig. 5, each of the ramp boards 195 being provided at one end thereof with a hook 196 which is adapted to be hooked over one of the brackets 46 or 197 on the side of the pipe transport from which it is desired to unload said pipe. When thus supported by one end on these brackets, the ramp boards 195 are inclined outwardly and downwardly so as to come to rest on the ground or upon any rack for the pipe such as ground storage timbers 197. Stanchions along that side of the pipe transport 15 represented by the broken line 198 are removed from their sockets 51—115 thereby permitting pipe lengths 160 to be rolled from the pipe transport 15 one length at a time down the ramp boards 195 and onto the ground storage timbers 197. If the load of pipe on the pipe transport 15 is a fairly high load, short stanchions 53—117 may be placed in the sockets 51—115 on the unloading side, and the hooks 196 of the ramp boards 195 may be hooked in the upper ends of these tubular stanchions so that there will not be any great drop in the transfer of the pipe lengths from each of the upper tiers onto the ramp boards 195.

While the invention is shown in the drawings as embodied with a pipe transport embodying a power driven truck and trailer, it is understood to be adapted also for installation on any other suitable pipe transport means. It is also understood that while the invention is preferably operated through a power take-off from the engine of the truck, a separate power plant for actuating the invention might be provided as for instance, where the invention is incorporated with a single long trailer or with one or more railway flat cars.

Although a particular adjustment in the rearward spacing of the trailer 17 from the truck 16 is shown in Figs. 1 and 2, it is to be understood that the invention provides means for altering this spacing within a very substantial range by the shifting of pin 93 selectively so as to penetrate any of the pairs of holes 94 provided in the tongue 18. When thus adjusting the spacing between the truck 16 and trailer 17 in order to adapt the pipe transport 15 for the handling of pipe sections 160 of different length, the connection between the cable 139 and the cable 80 through the chain 45 and hook 147 is correspondingly adjusted to compensate for the change in spacing between the truck 16 and the trailer 17 and cause the loading arms 72—132 to continue to be raised simultaneously and in the same relative positions upon the actuation of the winch 32 to pull on both cables 80 and 139.

Susceptible as the invention is of many applications and modifications, all of the latter properly coming within the spirit of the invention are understood as being embraced within the scope of the appended claims.

The claims are:

1. In combination: a motor driven truck; a trailer pivotally hitched to said truck; a pair of spaced pipe rests, one of which is provided on said truck and the other of which is provided on said trailer; means for vertically pivoting on said truck the rest provided thereon; a pair of loading arms, the inner ends of which are independently pivoted on a horizontal axis on corresponding sides of said truck and trailer respectively, said axis being located at a level disposed a substantial distance below the pipe-supporting surfaces of said pipe rests; unitary flexible power means on said truck and connected to said arms on both said truck and trailer for simultaneously swinging said pipe loading arms upwardly about said horizontal axis, the extremities of said arms being inclined upwardly to form feet which retain a section of pipe on said arms when placed thereon with said arms inclined downwardly at a substantial angle from horizontal; and secondary arms provided on said pipe loading arms which extend upwardly therefrom, the lifting of said section of pipe by swinging said pipe loading arms upwardly causing said pipe to roll inwardly along said arms against said secondary arms, the latter arms preventing further inward rolling of said pipe section on said loading arms as the upward rotation of the latter continues, said secondary arms being angularly related to said loading arms whereby said secondary arms may finally be moved through horizontal positions and thus become inclined inwardly above said pipe rests whereby said pipe section rolls inwardly along said secondary arms and is deposited from the inner ends of the latter onto said pipe rests.

2. A combination as in claim 1 in which said loading arms are provided with a plurality of sockets into which said secondary arms may be fitted at different distances from said horizontal axis whereby pipe sections may be delivered by the upward swinging of said loading arms at successively higher levels so as to form successive superimposed layers of pipe supported on said rests a pair of vertical sockets being arranged in side by side relation on each end of each of said pipe rests, in planes parallel with the longitudinal axis of said truck; and stanchions received in said sockets for retaining on said rests a load of pipe lengths delivered thereto, said stanchions differing in height so as to optionally provide a stanchion on the loading side of each of said rests which is of sufficient height to retain on said rests a layer of pipe being delivered thereto at a given time but low enough not to interfere with the delivery of said pipe from said secondary arms onto said rests.

3. A combination as in claim 2 in which two ramp bars are provided, each of which has means at one end thereof for engaging the upper end of a stanchion so as to be supported thereon whereby pipe lengths delivered over the stanchions at the loading side of the truck and trailer are received on said bars and roll down the same toward the far side of said pipe rests.

4. In combination: a motor driven truck; a two-wheeled trailer having a tongue extending forwardly therefrom and pivotally connected to said truck; a pair of spaced pipe rests, one of which is provided on said truck and the other of which is provided on said trailer; means for pivotally mounting the rest on said truck on a vertical axis; a pair of loading arms the inner ends of which are pivoted on a horizontal axis on said truck and trailer respectively, said axis being located at one side of said truck and trailer at a level disposed below the pipe supporting surfaces of said pipe rests; means for adjustably relating said trailer to said tongue to vary the distance between said trailer and said truck; power means on said truck connected to said loading arms on said truck and trailer and operative, for various spacings of said truck and trailer, to swing said pipe loading arms upwardly about said horizontal axis; upwardly turned feet formed on the extremities of said loading arms to retain a section of pipe on said arms when the latter are inclined downwardly at a substantial angle from horizontal and then swung upwardly to lift said pipe section; and secondary arms provided on said pipe loading arms and extending upwardly therefrom, the swinging of said pipe loading arms upwardly for lifting said section of pipe causing said pipe to roll inwardly along said arms and against said secondary arms, the latter arms preventing further inward rolling of said pipe section on said loading arms as the upward rotation of the latter continues, said secondary arms being so related angularly to said loading arms whereby said secondary arms finally move through horizontal positions and are inclined inwardly above said pipe rests whereby said pipe section rolls inwardly along said secondary arms and is deposited from the inner ends of the latter onto said pipe rests.

5. A combination as in claim 4 in which said power means comprises a winch mounted on said truck; transmission means connecting said winch to the motor of said truck; a pair of centrally disposed sheaves mounted respectively on said truck and trailer adjacent the transverse vertical planes in which said loading arms swing; a pair of laterally disposed sheaves mounted respectively on said truck and trailer on a horizontal axis and disposed close to and above the inner ends of said loading arms and in said vertical transverse planes; a cable wound upon said winch; a pair of cables connected to said loading arms and passing over said lateral sheaves and turning about said central sheaves and extending therefrom toward said winch; and means for adjusting the relative length of said loading arm cables and connecting the forward ends of the same to said winch cable.

6. A combination as in claim 5 in which means is provided for optionally mounting said loading arms and lateral sheaves on either of the two opposite sides of said truck and trailer thereby rendering it optional as to which of the two sides of said truck and trailer pipe may be loaded onto said pipe rests.

7. In combination: a pipe transport; pipe rest means supported on said transport; a pair of loading arm receptacles provided in parallel spaced relation on said transport, and extending transversely thereof; a pair of mounting members slidably received in said receptacles and optionally extending from said receptacles on either side of said transport; a pair of loading arms the inner ends of which are pivoted on said mounting members, said members having suitable vertical apertures just inwardly from the axis of the pivotal connections between said members and said arms; sheave mounts having stems adapted to be received by said apertures; sheaves rotatably supported on said sheave mounts to rotate in the respective transverse vertical planes in which said loading arms swing; a power driven winch on said transport; a pair of cables connected to said loading arms and passing over said sheaves; and sheave means guiding said cables from said sheaves to said winch whereby said arms are swung upwardly and downwardly in unison by the operation of said winch.

References Cited in the file of this patent

UNITED STATES PATENTS

| Number | Name | Date |
|---|---|---|
| 2,194,125 | Rinehart | Mar. 19, 1940 |
| 2,342,344 | Hunter | Feb. 22, 1944 |
| 2,419,442 | Dorsey, Jr. | Apr. 22, 1947 |
| 2,487,305 | Bridegroom | Nov. 8, 1949 |
| 2,496,388 | Gilbey | Feb. 7, 1950 |
| 2,525,735 | Symons | Oct. 10, 1950 |

FOREIGN PATENTS

| Number | Country | Date |
|---|---|---|
| 110,481 | Sweden | Apr. 25, 1944 |